J. TESSIER.
FILM MAGAZINE.
APPLICATION FILED APR. 30, 1913.

1,111,506.

Patented Sept. 22, 1914.

WITNESSES:

INVENTOR
Julien Tessier,
BY
Charles N. Butler
ATTORNEY.

UNITED STATES PATENT OFFICE.

JULIEN TESSIER, OF PHILADELPHIA, PENNSYLVANIA, ASSIGNOR TO LUBIN MANUFACTURING COMPANY, OF PHILADELPHIA, PENNSYLVANIA, A CORPORATION OF PENNSYLVANIA.

FILM-MAGAZINE.

1,111,506. Specification of Letters Patent. Patented Sept. 22, 1914.

Application filed April 30, 1913. Serial No. 764,507.

*To all whom it may concern:*

Be it known that I, JULIEN TESSIER, a citizen of the Republic of France, residing in the city of Philadelphia, county of Philadelphia, and State of Pennsylvania, have invented certain Improvements in Film-Magazines, of which the following is a specification.

My invention relates to improvements in magazines for moving picture films, and its leading object is to provide convenient and efficient film reeling mechanism.

The characteristic features of my improvements are disclosed in the following description and the accompanying drawings in illustration thereof.

Figure 1:
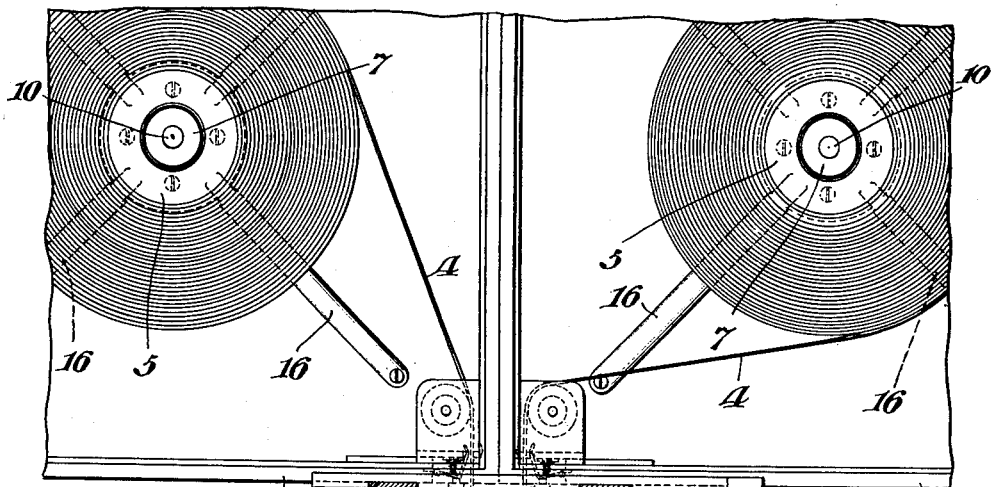
Figure 2:
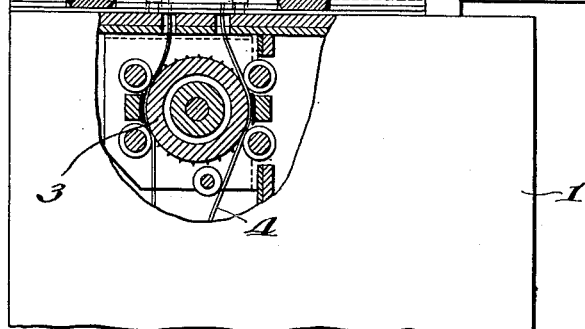
Figure 3:
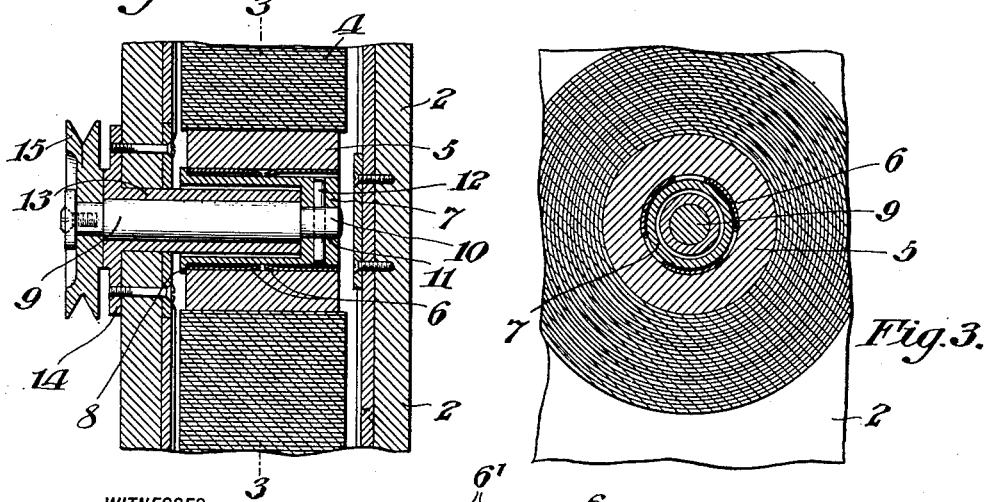
Figure 4:
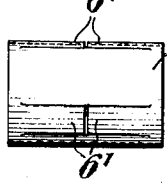

In the drawings, Figure 1 is a broken sectional elevation taken through the top of a motion picture camera in combination with film magazines having my improvements applied thereto; Fig. 2 is a broken sectional view taken through the axis of the reeling mechanism in a magazine; Fig. 3 is a broken sectional view taken on the line 3—3 of Fig. 2; and Fig. 4 is a side elevation of a detail of the construction.

The mechanism, as illustrated in the drawings, comprises the camera 1 having thereon the film magazines 2. The camera contains the sprocket wheel 3 for engaging the film 4 which is wound from the spool 5 of one magazine through the camera 1 to the spool 5 of the other magazine. Each spool or hollow cylinder 5 contains a sleeve 6 having the spring sections 6' which are sprung inwardly, the spool with the sleeve being frictionally engaged by the springs on a cylindrical thimble 7 provided with a flange 8 against which the spool abuts. The thimble is fixed on a spindle 9 having a reduced end 10 which extends through the aperture 11 in the end of the thimble, a pin 12 engaging the end of the thimble and spindle together. The spindle 9 is journaled in the tubular bearing 13 which extends through the wall of the magazine into the thimble 7 against the end thereof and is provided with the flange 14 which is fixed to the magazine wall. The pulley 15 is fixed on the spindle 9 and acts therethrough to revolve the thimble 7 and the spool 5 frictionally clutched thereon by the springs 6', whereby the film 4 is wound on the spool 5. Fixed within the parallel sides of the magazine are the radial bearings 16 adapted for engaging the edges of the film in the reeling operation to keep the layers in the desired position and to prevent, as is found to be the case, the development and retention of a static charge of electricity commonly due to the rubbing of the film against the walls of the magazine.

Having described my invention, I claim:

1. A magazine having a tubular bearing fixed thereto, a spindle journaled in said bearing, and a thimble fixed to said spindle and sleeved on said bearing, said thimble having a flange thereon, in combination with a spool sleeved on said thimble, said spool having means for frictionally clutching it on said thimble.

2. In a film reeling mechanism, a stationary tubular bearing, a spindle journaled therein, a thimble telescoped on said bearing and fixed to said spindle, and a spool containing a sleeve provided with spring sections frictionally engaged on said thimble.

3. A film magazine having a tubular bearing, a spindle journaled therein, a thimble fixed to said spindle and telescoped on said bearing, a spool sleeved on said thimble, and means adapted to engage an edge of film wound on said spool.

In testimony whereof I have hereunto set my hand this 14th day of April, 1913, in the presence of the subscribing witnesses.

JULIEN TESSIER.

Witnesses:
CHARLES GOLDSMITH,
JOS. G. DENNY, Jr.